United States Patent
Gehrken et al.

[15] 3,650,906
[45] Mar. 21, 1972

[54] THIN FILM HEATING FOR THE PRELIMINARY PURIFICATION OF CRUDE PHTHALIC ANHYDRIDE

[72] Inventors: Hubert Gehrken, Weiden; Gerd Helms, Junkersdorf; Gerhard Keunecke, Geyen; Herbert Krimphove, Cologne, Mungersdorf, all of Germany

[73] Assignee: Chemiebau Dr. A. Zieren GmbH & Co. KG, Cologne-Mungersdorf, Germany

[22] Filed: Apr. 14, 1969

[21] Appl. No.: 816,112

[30] Foreign Application Priority Data

Apr. 13, 1968 Germany ..................... P 17 68 211.0

[52] U.S. Cl. ............................... 203/89, 159/13 A, 159/49, 260/346.7
[51] Int. Cl. ........................................ B01d 1/22, B01d 3/00
[58] Field of Search .................... 159/6 W, 49, 13 A; 23/294, 23/293; 260/346.7, 525, 346.4; 203/89

[56] References Cited

UNITED STATES PATENTS

| | | |
|---|---|---|
| 3,011,955 | 12/1961 | Brown..............................260/346.7 X |
| 3,199,574 | 8/1965 | Keller....................................159/6 W |
| 3,311,457 | 3/1967 | Goosens...........................159/6 W X |
| 3,420,750 | 1/1969 | Schaefer et al. .....................203/89 X |
| 3,428,423 | 2/1969 | Egbert ............................260/346.7 X |

Primary Examiner—Norman Yudkoff
Assistant Examiner—J. Sofer
Attorney—I. William Millen, M. Ted Raptes and John L. White

[57] ABSTRACT

In the preliminary purification (prior to distillation) of crude phthalic anhydride produced from xylene, the pretreatment is improved by heating a thin film of molten phthalic anhydride to 200–280° C. during the course of not more than 60 seconds, said film having a thickness of not more than 2 mm.

17 Claims, 1 Drawing Figure

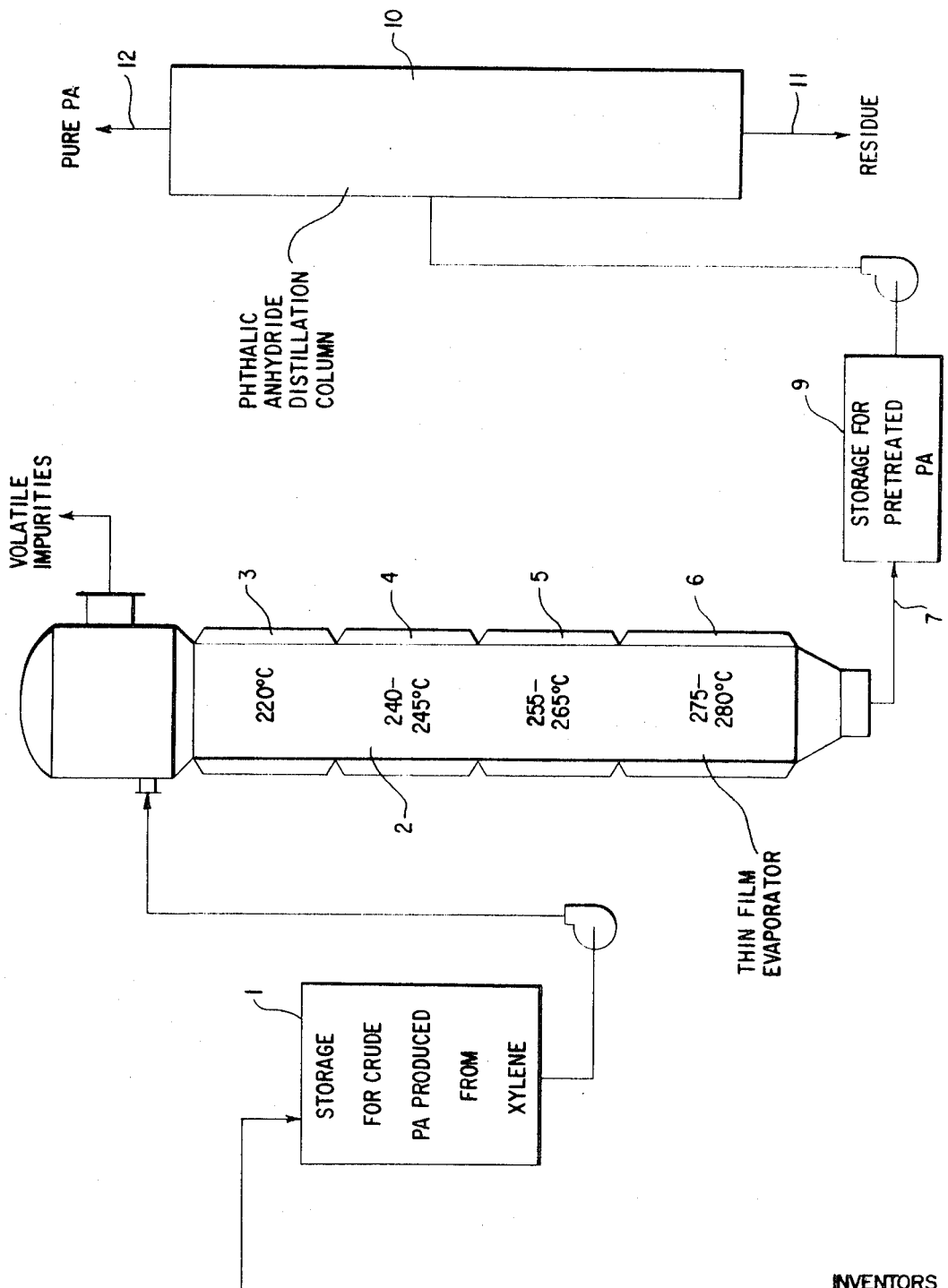

THIN FILM HEATING FOR THE PRELIMINARY PURIFICATION OF CRUDE PHTHALIC ANHYDRIDE

BACKGROUND OF THE INVENTION

This invention relates to a process for the continuous preliminary purification of crude phthalic anhydride produced from o-xylene, wherein said crude is heated to a treatment temperature of 200–280° C.

In contradistinction to the naphthalene-based process, crude phthalic anhydride produced by the catalytic air oxidation of o-xylene contains no polymerizable components which must be eliminated by a polymerization and separation pretreatment prior to the distillation step.

However, the crude product produced from o-xylene does contain, in addition to phthalic anhydride, (PA) varying quantities of phthalic acid, benzoic acid, maleic acid, maleic anhydride, o-toluic acid, phthalide, higher boiling components, and a non-distillable residue. Because of economic and technical considerations, it is desirable to convert the acids, before entrance into a distillation plant, into the anhydrides thereof, with water being split off, and to remove other low-boiling components entirely or in part.

It is conventional to conduct this dehydration step in such a manner that the entire crude product is heated in an agitated vessel or in cascades of agitated vessels, to temperatures of between 190 and 280° C. This process can be conducted discontinuously or continuously, but requires on a large industrial scale, considerable investment for the pretreatment plant. In addition, residence times of between about five and 100 hours are common, thereby increasing the investment capital even further for on-stream inventory. This thermal treatment is conventionally conducted in the liquid phase without any prior separatory treatment of said liquid phase.

SUMMARY OF THE INVENTION

Bearing in mind the above-described disadvantages of prior art processes, an object of this invention is to provide an improved preliminary purification process, hereinafter called "pretreatment" or "thermal treatment," the latter term being found in prior art references.

A particular object is to markedly reduce the residence times associated with the old processes.

Another object is to provide a pretreatment wherein such mild reaction conditions exist that there are encountered only negligible decarboxylation or cracking reactions.

Upon further study of the specification and claims, of the objects and advantages of the present invention will become apparent.

To attain the above objects, the pretreatment is conducted by passing the molten crude phthalic anhydride in the form of a film having a thickness of at most two mm. over a heated surface and heating it during this procedure within at most 60 seconds to the treatment temperature. In this way the splitting of water from any maleic and phthalic acid present in the crude product, as well as the vaporization and removal of any nascent water from the crude product is accomplished in a much shorter time than previously.

DETAILED DISCUSSION OF THE INVENTION

Whereas the film thickness must not exceed two mm., it is preferred to use even smaller thicknesses, less than 1.7 mm., and especially in the range of 0.6 to 1.5 mm. Similarly, while the pretreatment heating time must not exceed 60 seconds, it is even more desirable for it to be shorter, no more than 40 seconds, and preferably in the range of five to 30 seconds. By "pretreatment heating time" is meant the time at which the crude molten phthalic anhydride is at a temperature of 200–280°C. The pretreatment is normally conducted under atmospheric pressure. However, a reduced pressure (e.g., in the range of 400–760 torr [mm. Hg] is likewise possible; in this connection, the film temperature must be below the boiling temperature of the phthalic anhydride at this lower pressure.

By operating according to this invention, it has been unexpectedly discovered that not only can the water be split off from the phthalic and maleic acid completely, but also, despite very short residence times, a large portion, e.g., 10 to 50 percent, of the impurities more volatile then phthalic anhydride are vaporized. Consequently, crude phthalic anhydride subjected to the pretreatment of this invention can be freed of the remaining volatile components by a less costly distillation step than heretofore was normally employed.

The preferred technique of this invention comprises conducting the molten phthalic anhydride film over a heating surface subdivided into a plurality of separated heating zones, the temperature of each zone increasing in the direction of film flow. The film is thus heated within not more than one minute from, the example, 170° C. to about 280° C. The thinness of the film permits a relatively rapid thermal equilibrium to occur with respect to the film temperature on the heating zones. In addition, because of the large specific surface of the film, a high rate of mass transfer is achieved, whereby the water and other readily volatile components in the film enter into the gaseous phase.

A particularly beneficial technique is to provide that the film passes the hottest heating zone, just below the boiling point of the phthalic anhydride for only a very brief period. For example, the film should be in contact with a heat exchange zone of about 275–280° C. for not more than two, preferably not more than one seconds. In this way, evaporation losses are substantially avoided, and no accumulation of undesired deposits occurs on the hot heating surface.

Preferably, the molten phthalic anhydride film is allowed to pass over four heating zones with temperatures of 220–230° C.; 240–245° C.; 255–265° C. and 275–280° C.

The time-temperature conditions are preferably as follows:

| Zone | Temperature | Residence Time |
|---|---|---|
| 1 | 220°–230° C. | 10–20 sec. |
| 2 | 240°–245° C. | 4–8 sec. |
| 3 | 255°–265° C. | 2–4 sec. |
| 4 | 275°–280° C. | 0.2–1 sec. |

In the prior art pretreatment processes residence times in the range from five to 100 hours are used. These processes prescribe the long pretreatment times irrespective of the type of the crude phthalic anhydride (i.e., obtained from naphthalene or o-xylene) and it was a generally accepted opinion that pretreatment must last for these long times in order to convert the contaminants to products capable to be separated by distillation. We have however found that this is only valid for the condensation of naphthoquinone present in crude phthalic anhydride obtained by oxidation of naphthalene to a nonvolatile resin but not for the phthalic acid and maleic acid present in the crude phthalic anhydride obtained by o-xylene oxidation. These acids are converted under pretreatment conditions to the respective anhydrides in a very short time. For shortening the pretreatment as a whole, time and path of diffusion must also be reduced in order not to make diffusion the rate controlling step. Thus our invention is based on a reduction of the diffusion path together with the knowledge about the fast formation of the anhydrides, which combination allows a considerable reduction of the pretreatment time for crude from o-xylene.

The thus-prepurified phthalic anhydride is collected in a tank from which it is fed to a distillation plant.

In accordance with the preferred embodiment of the invention, the molten phthalic anhydride is allowed to pass over the inner surface of a vertical column generally having an inside diameter of at least 80 mm. The crude molten product is distributed uniformly over the circumference of the column at the upper end of the column, for example, with the aid of a rotor. It is also advantageous for the surface of the film of phthalic anhydride formed on the heating surface to be constantly renewed by having mechanical components such as vanes move through the film at right angles to the direction of film flow. When conducting the pretreatment in a vertical pipe, the latter is equipped with an agitator, the blades of which rotate at a distance from the heating surface corresponding to the thickness of the film. Thereby, there is achieved a thorough mixing of the phthalic anhydride film resulting in a satisfactory heat transfer from the heating surface to the film.

The various heating zones of the pretreatment apparatus can be maintained at the desired temperatures either electrically or by a heat transfer fluid. In this connection, the heating surface exhibits the lowest temperature at the feed end for the crude phthalic anhydride, and the highest temperature at the discharge end, thereby simulating indirect countercurrent heat exchange. The pretreatment can also be conducted at a uniform temperature; in this case, the process is conducted preferably with smaller film thicknesses, e.g., 0.5 to 1.2 mm., the lower the pretreatment temperature employed, the smaller the thickness.

The film thickness can be adjusted in a simple manner by the spacing of the agitator blades from the heating surface. The residence time at the pretreatment temperature is dependent on the flow rate of the film and the length of the heating surface. The residence time at the pretreatment temperature is dependent on the flow rate of the film and the length of the heating surface. This residence time can be adapted to the desired degree of purity by varying the length of the heating surface, e.g., by positioning several film heating elements in series.

BRIEF DESCRIPTION OF DRAWING

The attached drawing is a schematic representation of a preferred embodiment of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

EXAMPLE 1

This example will be explained with reference to the attached drawing.

Crude phthalic anhydride, produced by the vapor phase oxidation of o-xylene is collected in tank 1, and, is passed in the liquid phase to the upper end of a a vertical cylindrical column 2 along the circumference thereof. The formed film thereafter flows by gravity down the column 2 having an internal diameter of 82 mm., a height of 500 mm., and a surface area of 0.129 m². It is divided into four separately controllable heating zones 3, 4, 5, 6 by means of externally mounted electrical strip heaters of a width of 120 mm. The temperature of the column wall was set, with the aid of the heating strips, so that there were measured in the uppermost zone 3, a wall temperature of 220° C.; in the second zone 4, of 240–245° C.; in the third zone 5, of 255–265° C.; and in the lowermost zone 6, a temperature of 275–280° C. The column was placed in communication with the atmosphere at the upper end, so that the preliminary purification was conducted under atmospheric pressure, and the more volatile components escaping from the film could freely emanate from the column.

At the upper end of the column 2, 25 kg./h. of molten crude phthalic anhydride was charged at a temperature of 170° C. This crude product consisted of 94.4 percent by weight of phthalic anhydride, 4.5 percent by weight of phthalic acid, 0.4 percent by weight of maleic acid anhydride and maleic acid, 0.1 percent by weight of benzoic acid, 0.1 percent by weight of phthalide, 0.1 percent by weight of o-toluic acid, 0.18 percent by weight of residue and unknown components having a higher boiling point than phthalic anhydride, and 0.2 percent by weight of unknown components having a boiling point lower than phthalic anhydride. The water-insoluble residue amounted to 0.13 percent by weight. The hot melt exiting from the column 2 was passed, via a conduit 7 into a collecting tank 9. The residence time in the apparatus was about nine seconds. The thickness of the film was approximately 0.5 mm. The product was obtained at a rate of 24.76 kg./h. and contained 99.3 percent by weight of phthalic anhydride 0.2 percent by weight of maleic acid anhydride, 0.06 percent by weight of benzoic acid, 0.08 percent by weight of o-toluic acid, 0.1 percent by weight of phthalide, 0.19 percent by weight of residue and unknown components having a higher boiling point than phthalic anhydride and 0.07 percent by weight of unknown components having a lower boiling point than phthalic anhydride. The concentration of water-insoluble residue had risen to 0.15 percent by weight. The phthalic anhydride subjected to the pretreatment according to the invention was then pumped from tank 9 into the distillation column 10 in which a high boiling residue was separated at 11 and the purified phthalic anhydride was distilled overhead at 12.

EXAMPLE 2

The pretreatment of this invention can also be conducted on vertically disposed plates, the surfaces of which are corrugated and are heated from the inside. Especially suitable is an inclined pipe having a planar underside. The underside of the pipe forms an inclined plane which is heated from underneath.

The phthalic anhydride is charged at the upper end of the pipe distributed over the entire width of the planar underside, and flows downward along this side in the form of a film, and is heated to progressively higher temperatures. In the pretreatment of this invention, it is to be understood that the hating in the pretreatment step not only converts the phthalic acid and maleic acid impurities into the corresponding anhydrides, but also because of the temperatures involved, inherently evaporates low boiling impurities, e.g., the water split off during the formation of the anhydrides. Conversely, though, it is not desired to vaporize the phthalic anhydride during this pretreatment step.

The preceding two examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for the continuous purification of crude phthalic anhydride produced from o-xylene, said process comprising subjecting said crude phthalic anhydride containing maleic and phthalic acid impurities to a thermal treatment in the liquid phase without any prior separatory treatment of said liquid phase, and then subjecting resultant thermally treated phthalic anhydride to distillation, the improvement wherein said thermal treatment comprises passing a thin film of said crude phthalic anhydride in the molten phase in contact heat exchange relationship with a heated surface to heat said crude phthalic anhydride to 200–280° C. but less than the boiling temperature of phthalic anhydride and under an absolute pressure of about 400–760 mm. Hg, said thin film having a thickness of not more than two mm., and said heat exchange being conducted for not more than 60 seconds, whereby the maleic and phthalic acid impurities are converted to the corresponding anhydrides, and impurities more volatile than phthalic anhydride are vaporized and removed.

2. A process according to claim 1 wherein said heating surface comprises the inner surface of a vertical column.

3. A process according to claim 1, further comprising the step of passing agitator blades through the moving at right angles to the direction of flow of the film to continuously obtain fresh film surfaces, thereby increasing the rates of heat exchange and mass transfer.

4. A process according to claim 1 wherein said heat exchange is conducted for not more than 40 seconds.

5. A process as defined by claim 1 wherein the film thickness is less than 1.7 mm.

6. A process as defined by claim 1 wherein the film thickness is 0.6 to 1.5 mm.

7. A process according to claim 1 wherein said heat exchange is conducted for 5–30 seconds.

8. A process as defined by claim 7 wherein the film thickness is 0.6 to 1.5 mm.

9. A process as defined according to claim 1, said heating surface being subdivided into a plurality of separate heating zones of different temperatures, the temperature of the zones increasing in the direction of the flow of the film.

10. A process according to claim 9 wherein said plurality of heating zones comprises four heating zones having heating surface temperatures of 220–230° C.; 240–245° C.; 255–265° C.; and 275–280° C. respectively.

11. A process according to claim 10 wherein said heating surface comprises the inner surface of a vertical column.

12. A process according to claim 11, further comprising the step of passing agitator blades through the moving film at right angles to the direction of flow of the film to continuously obtain fresh film surfaces, thereby increasing the rates of heat exchange and mass transfer.

13. A process as defined by claim 10 wherein the heat exchange at 275–280° C. is conducted for less than two seconds.

14. A process as defined by claim 10 wherein the heat exchange at 275–280° C. is conducted for less than one second.

15. A process as defined by claim 10 wherein the heat exchange time at 220–230° C. is 10–20 seconds; at 240–245° C., four to eight seconds; at 255–265° C., two to four seconds; and at 275–280° C., 0.2–1 second.

16. A process as defined by claim 15 wherein the film thickness is 0.6–1.5 mm.

17. In a process for the continuous purification of crude phthalic anhydride produced from o-xylene, said process comprising subjecting said crude phthalic anhydride containing maleic and phthalic anhydride impurities to a thermal treatment, and then subjecting resultant thermally treated phthalic anhydride to distillation, the improvement wherein said thermal treatment comprises passing a thin film of said crude phthalic anhydride in the molten phase at an absolute pressure of 400–760 mm. Hg in contact heat exchange relationship with a heating surface subdivided into four heating zones having heating surface temperatures of 220–230° C.; 240–245° C.; 255–265° C.; and 275–280° C., the temperature of the zones increasing in the direction of flow of the film and being less than the boiling temperature of phthalic anhydride, said thin film having a thickness of not more than two mm., and said heat exchange being conducted for not more than 60 seconds, whereby the maleic and phthalic anhydride impurities are converted to the corresponding anhydrides, and impurities more volatile than phthalic anhydride are vaporized and removed.

* * * * *

UNITED STATES PATENT OFFICE
CERTIFICATE OF CORRECTION

Patent No. 3,650,906　　　　　　Dated March 21, 1972

Inventor(s) HUBERT GEHRKEN ET AL.

It is certified that error appears in the above-identified patent and that said Letters Patent are hereby corrected as shown below:

CLAIM 3, Column 4, line 72: After "moving", insert -- film -- .

Signed and sealed this 26th day of June 1973.

(SEAL)
Attest:

EDWARD M. FLETCHER, JR.
Attesting Officer

ROBERT GOTTSCHALK
Commissioner of Patents